United States Patent [19]

Goldberger et al.

[11] 4,435,444

[45] Mar. 6, 1984

[54] METHOD OF MAKING ULTRA-MICROCRYSTALLITE SILICON CARBIDE PRODUCT

[75] Inventors: William Goldberger; A. K. Reed, both of Chicago, Ill.

[73] Assignee: Superior Graphite Co., Chicago, Ill.

[21] Appl. No.: 413,613

[22] Filed: Sep. 1, 1982

Related U.S. Application Data

[62] Division of Ser. No. 319,976, Nov. 10, 1981.

[51] Int. Cl.³ .............................................. B05D 3/14
[52] U.S. Cl. ..................................... 427/49; 427/182; 427/204; 427/227; 427/314; 427/399
[58] Field of Search ................. 427/49, 182, 204, 227, 427/314, 399

Primary Examiner—Bernard D. Pianalto
Attorney, Agent, or Firm—Robert M. Ward

[57] ABSTRACT

The present invention is directed to a reaction product of silica sand and of particulate carbonaceous material to form, silicon carbide on the surface of the carbonaceous particles and within the pores thereof, with the silicon carbide ultra-microcrystallites having a diameter of approximately 500 Angstroms and the composition comprising approximately 60% silicon carbide. The present invention is further directed to the process by which the ultra-microcrystallite silicon carbide product is made. In other preferred embodiments the ultra-microcrystallites of silicon carbide may be separated from the carbonaceous material by heat or physical methods to form a substantially pure ultra-microcrystallite silicon carbide product.

22 Claims, 12 Drawing Figures

EFFECT OF SILICON CARBIDE CONTENT
ON FURNACE RESISTANCE

FIG. 1  EFFECT OF SILICON CARBIDE CONTENT ON FURNACE RESISTANCE

FIG. 3 BED PRODUCT CARBON REMOVED BY IGNITION AT 1000C

FIG. 2 BED PRODUCT

FIG. 4 CYCLONE DUST

ANGLE 2θ, DEGREES
COMPARISON OF X-RAY DIFFRACTION PATTERNS

METHOD OF MAKING ULTRA-MICROCRYSTALLITE SILICON CARBIDE PRODUCT

This application is a division of application Ser. No. 319,976, filed 11,10,81.

BACKGROUND OF THE INVENTION

The present invention is directed generally to silicon carbides and methods of making the same, and more particularly to a novel form of silicon carbide comprising ultra-microcrystallites of beta form and alpha form silicon carbide disposed on the surface of particles of a carbonaceous material. In making this novel product, the carbonaceous material is reacted with silica sand in a fluidized bed under specified conditions.

Some prior art methods of producing silicon carbide have been accomplished by means of the Acheson batch-type, charge resistor furnace. These methods have occasioned various disadvantages, including slowness of production and non-uniformity of product caused, inter alia, by the cyclic build-up and tear down necessary in this batch-type process.

Other methods of producing silicon carbide of small particle size have been proposed in the prior art. However, these methods have required very finely divided starting materials, and have necessitated a variety of combustible gases as reagents, such as methane and mixtures of hydrogen and oxygen, as well as other reagents, such as hydrofloric and sulfuric acid to produce the silicon carbide. Needless to say, the atmospheric pollution created by such processes has rendered them undesirable.

Other methods have been proposed in the prior art, which methods require the utilization of a vaporous halide of elements such as silicon, which has increased both costs and environmental pollutants.

Yet further methods of producing silicon carbide of small particle size have been proposed in the prior art. However, these methods have required very finely divided carbon and silica particles, which in turn require dispersion in a solvent, such as alcohol to obtain an intimate dispersion of the silica in carbon, which has further increased costs and the dangers of silicosis in workers.

Wherefore, in view of the deficiencies and defects of these prior techniques, improvement is required and the same is accomplished as set forth herein below in connection with the description of the novel methods and the products of the present invention.

SUMMARY OF THE INVENTION

The present invention is directed to a novel product of silicon carbide and carbon, and methods for making the same. The novel product of the present invention is made by reacting relatively low cost and readily obtainable materials without the necessity for special and/or polluting reagents. The cost per unit weight of silicon carbide produced is relatively low, and the product obtained is ultra-microcrystallite in size, and thus is of special interest for use in applications such as high density sintered ceramics.

The novel silicon carbide and carbon composition formed in accordance with the present invention comprises free flowing granular particles, wherein the central portion of the particle is carbon, and the surface and pores of the carbonaceous particles are covered with a layer of beta form silicon carbide. The silicon carbide disposed on the surface of the carbonaceous particles comprises ultra-microcrystallites which are approximately 500 Angstroms in size, with the silicon carbide comprising approximately 60% by weight of the composite particle, which composite particle has a diameter of approximately 1 to 3 millimeters. The central carbon in the composition may be removed to obtain relatively pure silicon carbide by subjecting the composite particles to treatment with oxygen in the presence of heat to form gaseous carbon oxides. Whereupon, the remaining porous structure of the reacted composite particles having a diameter of 1 to 3 millimeters, which is essentially the same as the unreacted composite particles, and these may be crushed if desired, to yield the ultra-microcrystallites of silicon carbide in relatively pure form and in smaller size.

The novel beta form silicon carbide and carbon composition can be made by first admixing a substantially greater percentage of carbonaceous material in granular form with a substantially lesser percentage of silicon dioxide, such as silica sand, to form a loose free flowing granular mixture. Next, the mixture is introduced into a fluidized bed of granular carbon previously heated by passing an electric current directly through it. The electrical current being sufficient to raise the temperature of the carbon bed thereby heating the silicon dioxide upon entry and causing it to react with the carbonaceous material, but insufficient to decompose the silicon carbide after it is formed. The electrical current is supplied for a time sufficient to react all the silicon dioxide that is present. In certain embodiments, the above steps are then successively repeated by adding silicon dioxide to the previously reacted carbon until the particles of carbon are substantially covered by ultra-microcrystallites of silicon carbide. In certain other preferred embodiments, the process is run continuously. Reaction temperatures of approximately 1900° to 2000° C. are most efficient. Teh gas used to fluidize the granular bed material should be non-reactive. Nitrogen is a suitable fluidizing gas for this purpose. Alpha form silicon carbide may be made by heating the resultant beta form silicon carbide to a temperature above approximately 2200° C. or by reacting the reaction components at temperatures above approximately 2200° C.

DETAILED DESCRIPTION OF PREFERRED EMBODIMENTS

The methods of the present invention for producing the novel product thereof produce the beta, or cubic, form of silicon carbide, which forms as a coating on the carbonaceous, and preferably calcined petroleum coke, particles and within the pores thereof. The silicon carbide formed is pale green in color and of high purity. The silicon carbide diameter size is submicron and approximately 500 Angstroms in preferred embodiments.

The novel silicon carbide and carbon composition of the present invention is free-flowing, granular, and particulate in form. The particles include a carbon body having a surface containing a multiplicity of pores extending into the interior of the carbon body for a substantial distance relative to the diameter of the carbon body. The size of the composite particles in preferred embodiments is 1 to 3 millimeters.

Ultra-microcrystallites in the beta, or cubic, form of silicon carbide are disposed on and substantially cover the surface of the carbon body and are disposed within and line the walls of the pores of the carbon body. The silicon carbide of the microcrystallites have a diameter of approximately 500 Angstroms, with the silicon carbide comprising approxately 60% by weight of the composite reaction particles.

Substantially pure ultra-microcrystallites in the beta, or cubic, form of silicon carbide may be produced by applying heat to the composite reaction particles, and at a temperature sufficient to oxidize the carbon, but insufficient to oxidize or decompose the silicon carbide ultra-microcrystallites. The temperature utilized for oxidation of the remaining carbon to the gaseous carbon oxide state is at least approximately 700° C., but less than approximately 1300° C. in preferred embodiments. After the removal of the carbon, the product produced by this process has a mean diameter of approximately essentially the same as the unoxidized composite particle preferred embodiments, and may be crushed to yield yet further finely divided silicon carbide ultra-microcrystallites of size approaching the ultimate crystallite size that are within the range of 400–800 Angstrom units.

The novel silicon carbide and carbon composite product of the present invention may be produced by the process of first fluidizing in an inert gaseous medium and providing electrical current to an initial charge of particles of a carbonaceous material. The electrical current utilized is sufficient to raise and maintain the temperature thereof to a temperature sufficient to react silicon dioxide with the carbonaceous material to form silicon carbide. Next, additional carbonaceous material in the particulate form is mixed with the silicon dioxide. In one embodiment, the carbonaceous material is in substantially greater percentage and the silicon dioxide is in a substantially lesser percentage. This mixture is then fed into a bed of granular carbon fluidized with an inert gaseous medium previously heated to reaction temperature by passing on electrical current through the mixture, with the electrical current being sufficient to render a temperature which will react the silicon dioxide with the carbonaceous material, but which temperature is insufficient to decompose the formed silicon carbide. The time of the reaction is sufficient to react substantially all of the silicon dioxide that is present. The above steps can then be successively repeated until the electrical resistance of the reacted mixture increases due to the build up of silicon carbide on substantially the entire surface of the carbonaceous particles and limiting the ability to maintain the furnace at the reaction temperature.

In conducting this method, the initial start-up charge of carbonaceous material is gradually replaced by a first mixture of the carbonaceous material and the silicon dioxide. The temperature utilized is preferably at least 1900° C., but less than approximately 2000° C., although temperatures of less than 1900° C. may be utilized, but less efficiently. Although silicon carbide decomposes at approximately 2700° C., the use of electrical resistance heating may cause some greater localized temperatures when the mean bed temperature is much lower.

Each addition of silicon dioxide to the prior successive reaction mixture is made in an approximate ratio of 1 part of silicon dioxide and 9 parts of the prior reaction mixture. Each successive charge of silicon dioxide and prior reaction mixture is preferably reacted for a period of approximately 6 to 7 hours, with the entire reaction being run until the electrical resistance of the composite particles rises asymptotically when the silicon carbide content is approximately 60%, which occurs after about 78 hours of reaction time.

In the above method, the steps are repeated until substantially the entire surface of the carbonaceous material is covered with ultra-microcrystallites of silicon carbide and the walls of the pores of the carbonaceous particles are substantially entirely coated with the ultra-microcrystallites of silicon carbide.

Various means may be utilized for separating the silicon carbide from the remaining carbon in the composite reaction particles. One preferred method is to provide oxygen and temperatures sufficient to oxidize the remaining unreacted carbonaceous material to a carbon oxide gas. Whereupon, the remaining ultra-microcrystallites of silicon carbide may be crushed into a finely divided powdered, if desired.

Alternatively, the silicon carbide content may be enriched by crushing the reacted silicon carbide and carbonaceous composite reaction particles and beneficiating the crushed product. Thereafter, the silicon carbide rich fraction may be separately collected. The carbonaceous rich fraction can be pelletized and recirculated as feed stock for reacting with additional silicon dioxide.

Preferred materials which are readily available and relatively inexpensive are calcined petroleum coke and silica sand. The size range of preferred calcined petroleum coke is approximately minus 20 to plus 65 mesh and the silica sand may preferably have a size range of approximately minus 40 to plus 100 mesh.

Yet additionally, elements such as magnesium and other elements can be introduced into the crystal structure of the carbide by beginning with reactants containing, inter alia, these elements.

Various reaction furnaces may be utilized to produce the novel products of the present invention and to carry out the methods of the present invention, one apparatus suitable therefor is that the shown and U.S. Pat. No. 4,160,813 to Richard F. Markel and William M. Goldberger.

The novel products of the present invention and the processes of the present invention by which the same are made may be better understood with reference to the following examples, detailed description of the figures, and incorporated tables:

EXAMPLE 1

Although various silicon dioxide materials may be used, one preferred material is "Bond" grade silica sand supplied by the Ottawa Sand Company, being of minus 40 to plus 100 mesh. A typical analysis of the sand is shown in Table 1, infra.

TABLE 1

| | | Physical Analysis | | | |
|---|---|---|---|---|---|
| U.S. Sieve No. | Millimeter Designation | Mean % on Sieve | Std. Dev. | Mean % Cumulative | Mean % Passing |
| 30 | .595 | — | — | — | 100.0 |
| 40 | .420 | 0.2 | 0.2 | 0.2 | 99.8 |
| 50 | .297 | 2.0 | 2.0 | 2.2 | 97.8 |
| 70 | .210 | 22.9 | 3.8 | 25.1 | 74.9 |
| 100 | .149 | 38.7 | 3.1 | 63.9 | 36.1 |
| 140 | .105 | 26.4 | 2.6 | 90.3 | 9.7 |
| 200 | .074 | 8.1 | 2.0 | 98.4 | 1.6 |
| 270 | .053 | 1.7 | 4.2 | 100.1 | 0.0 |

| | Mean |
|---|---|
| AFS Grain Fineness | 80.5 |
| Actual Surface Area ($cm^2/gm$) | 175.7 |
| Base Permeability | 64.0 |
| Theoretical Surface Area ($cm^2/gm$) | 145.7 |
| Coefficient Area | 1.22 |
| Density (Uncompacted) ($lb/ft^3$) | 88.3 |
| Density (Compacted) ($lb/ft^3$) | 93.0 |
| Acid Demand (pH-4) | 1.8 |

| Chemical Analysis | |
|---|---|
| $SiO_2$ | 99.692 |
| $Fe_2O_3$ | .063 |
| $TiO_2$ | .057 |
| $Al_2O_3$ | .068 |
| CaO | .01 |
| MgO | .01 |
| LOI | .10 |

EXAMPLE 2

In a first period of operation (designated as Run 22A), the furnace described in U.S. Pat. No. 4,160,813 was initially heated by recycling 691 pounds of calcined petroleum coke. The initial starter bed material was displaced by feeding a previously blended mixture of petroleum coke and silica sand in a weight ratio of 9:1. The blend was fed at a uniform rate of approximately 100 pounds per hour over a period of between 6 and 7 hours. The displaced product collected from the furnace during the reaction was sampled periodically for analysis. 640 pounds of starter bed material were recovered, 85 pounds of unfed 9:1 blend remained in the feed hopper, and 618 pounds of drum product were collected.

EXAMPLE 3

A second operating phase (designated as Run 22B), comprised reheating the furnace using the 640 pounds of recovered starter bed material to a temperature of approximately 2000° C. Thereafter, the starter bed material was gradually displaced, first by the 85 pounds of 9:1 blend which was unused in Run 22A, and then with the approximately 9:1 ratio mixture of 618 pounds recovered drum product from Run 22A with 69 pounds of silica sand. Run 22B was made at a temperature range of approximately 2000° C. to 2100° C. 534 pounds of twice used starter bed material were recovered. 52 pounds of Run 22B feed remained in the hopper, and 706 pounds of drum product from Run 22B were obtained, with 17 pounds of cyclone dust also being collected. Reaction samples were collected for analysis.

EXAMPLE 4

In a third phase of operation (designated as Run 23), the 52 pounds of unused Run 22B feed and the 706 pounds of Run 22B reaction product collected in the drums were fed into the furnace and used as a starter bed material, with silica being blended into each drum of collected product in a weight ratio of approximately 9:1. The operation was continued for a period of 78 hours, during which the furnace product was recycled to add a total of 580 pounds of silica sand to the 761 pounds of starter material. Operation was terminated when the electrical resistance of the system increased during Run 23 to such a level that adequate flow of electric current could no longer be maintained. A summary of the weights of feed and recovered solids for Examples 2-4 is shown in Table 2, infra.

TABLE 2

WEIGHTS OF FEED AND RECOVERED SOLIDS FOR SEGMENTS OF PILOT PLANT OPERATION

| | Run 22A | Run 22B | Run 23 |
|---|---|---|---|
| Solids Fed | | | |
| Starting Material | 691 (Coke) | 640 (Coke) | — |
| Added to Hopper | 691 (9:1 blend) | 85 (9:1 blend) | 758 (Run 22B Prod.) |
| | | 618 (Run 22A prod.) | 580 (Silica Sand) |
| | | 69 (Silica Sand) | |
| Recovered Solids | | | |
| Recovered Starter Bed | 640 (Coke) | 534 | — |
| Feed in Hopper | 85 | 52 | — |
| Drum Product | 618 | 706 | 642 |
| Cyclone Dust | — | 17 | — |

EXAMPLE 5

In Examples 2-4, supra, the furnace operation was observed to be very smooth throughout the entire operation. The closure of the exhaust flue by condensing vapors was more rapid during Run 22B of Example 3, which was made at higher temperatures than Run 22A of Example 2. No growth or build up of material occurred within the furnace.

A gradual increase in the electrical resistance of the furnace occurred as the silicon carbide content of the bed material increased to about 60% silicon carbide. The electrical resistance increased sharply after reaching this level of carbide after about 78 hours of operation.

Figure 1:
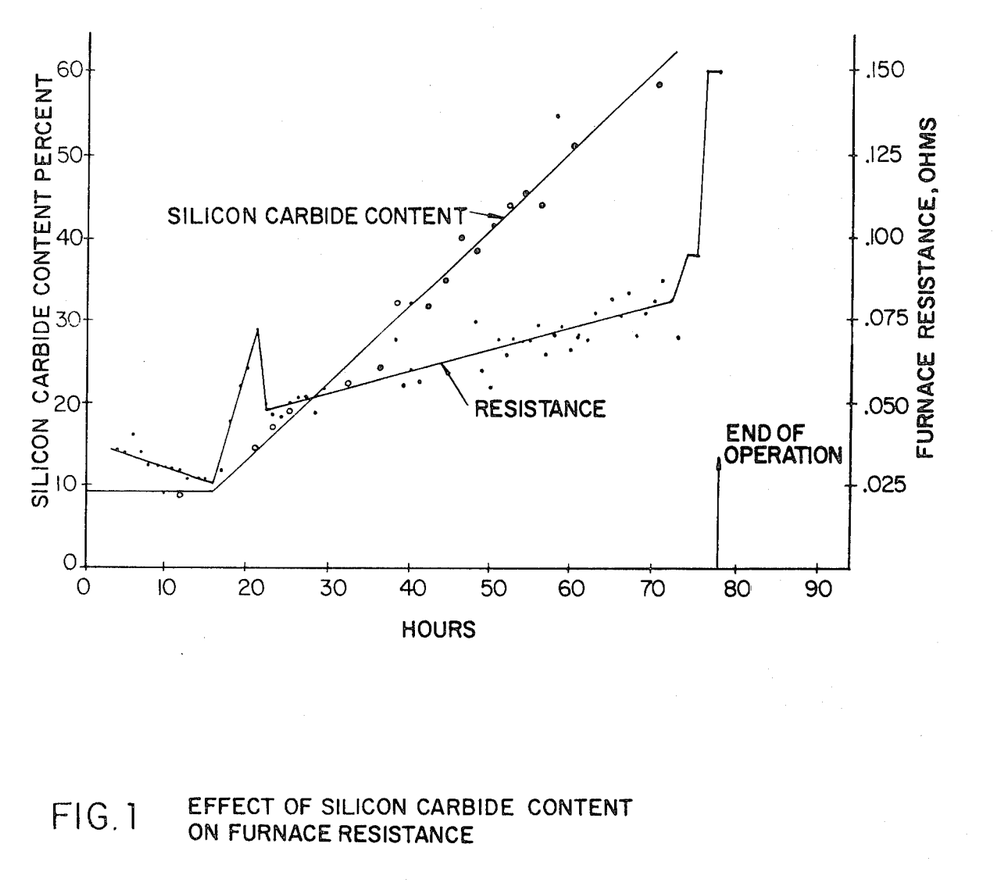
FIG. 1 is a graphical representation of silicon carbide content versus time and furnace resistance versus time, showing the direct proportional response between the percentage of silicon carbide content of the composite particles being reacted with the length of time of the reaction, and also showing the electrical resistance of the composite particles increasing with the deposition of silicon carbide on the surface thereof and with an asymptotic rise in resistance occurring after about 78 hours of the reaction.

The changes in silicon carbide content and electrical resistance of the furnace with time at steady state are shown in FIG. 1. Sample ignition tests made on product samples for ash content were used as the basis for the silicon carbide analysis which are the data points shown in the graph of FIG. 1. The data generated in these ignition tests are set forth in Table 3 hereof.

TABLE 3

| SAMPLE % SiC | OHM - INCH$^2$/INCH |
|---|---|
| HSC 1.8 (#1) | 0.02579 |
| HSC 6.9 (#2) | 0.02841 |
| HSC 11.6 (#3) | 0.02881 |
| HSC 24.2 (#4) | 0.06849 |
| HSC 41.5 (#5) | 0.17408 |
| HSC 60.4 (#6) | 1.1253 |
| 100% SiC | OFF SCALE NO READING |

During the start up of Run 23 of Example 4, supra, and using the bed product of Run 22B of Example 3, it was noted that metal vapors appeared at the exhaust flue when the furnace temperature as ready by an optical pyrometer exceeded about 2000° C. This indicates that there were zones in the furnace that exceeded 2700°, which is the temperature of decomposition of silicon carbide.

EXAMPLE 6

The various bed products obtained in Runs 22A, 22B, and 23 of Examples 2-4 were each free-flowing, granular materials similar in appearance to the initial calcined petroleum coke that was used as the carbon source. The silicon carbide content of the bed product samples was found by ignition loss evaluation, and varied from about 2% after the initial segment of the operation to a final level of about 60%. The product was noted to be porous and friable under modest pressure. Samples of the various bed product materials ranging in silicon carbine content from 1.8% to 60.4% were subjected to optical, x-ray and special photographic analysis. A sample of the ash from the ignition of the 60.4% silicon carbide bed product and a sample of the cyclone dust were also analyzed. The evaluated samples are set forth in Table 4, infra.

TABLE 4

LIST OF SAMPLES AND SILICON CARBIDE CONTENT[a]

| Sample Number | Origin | Run | % SiC |
|---|---|---|---|
| 1 | Bed Product | 22A | 1.8 |
| 2 | Bed Product | 22B | 6.9 |
| 3 | Bed Product | 22B | 11.6 |
| 4 | Bed Product | 23 | 24.2 |
| 5 | Bed Product | 23 | 41.5 |
| 6 | Bed Product | 23 | 60.4 |
| 7 | Sample 6 Ash | 23 | 100.0 |
| 8 | Cyclone Dust | 23 | — |

[a]Silicon carbide content determined as ash content by ignition of a sample at 1000° C.

Figure 2:
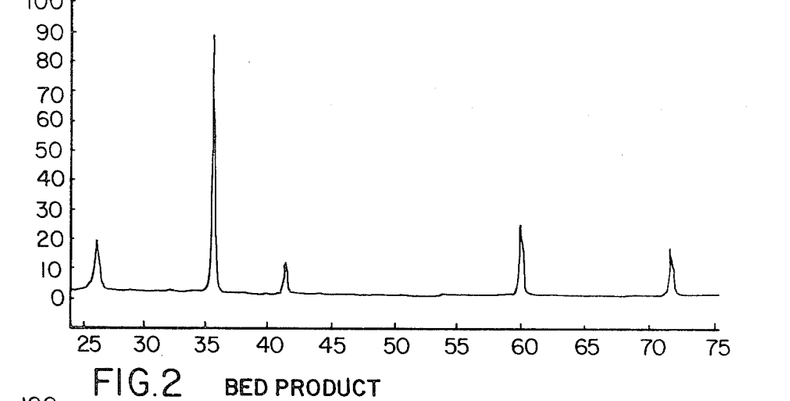
FIG. 2 is an x-ray diffraction pattern of the bed product after approximately 78 hours of the reaction, wherein the composite particles comprise approximately 60.4% of silicon carbide.
Figure 3:
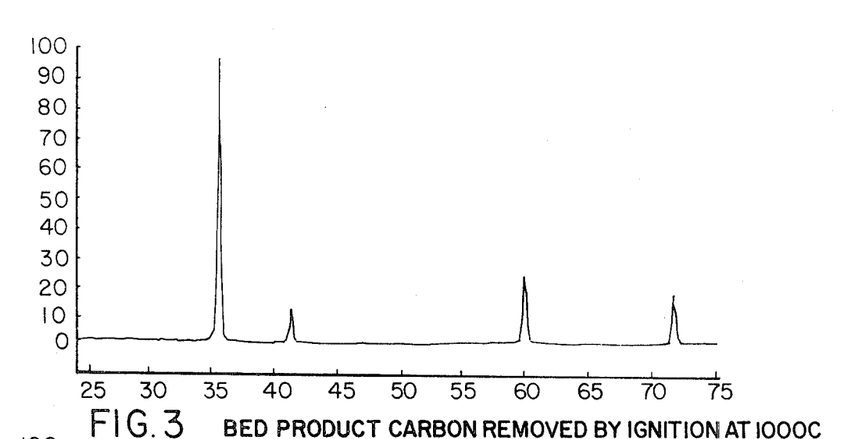
FIG. 3 is an x-ray diffraction pattern of the above bed product treated by addition of oxygen at 1000° C. to gasify any present carbon into the carbon oxides.
Figure 4:
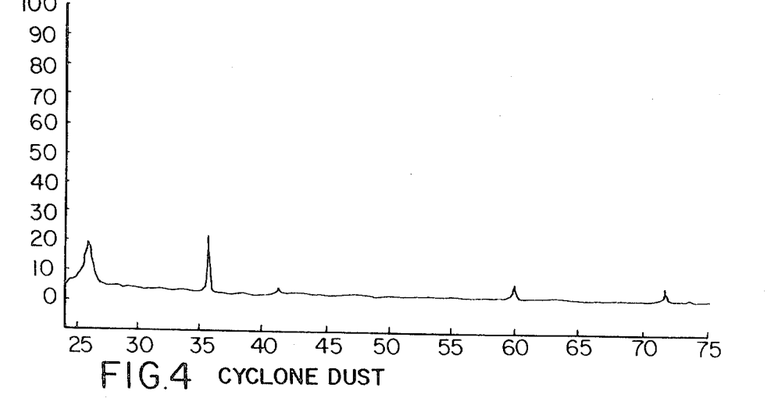
FIG. 4 is an x-ray diffraction pattern of the cyclone dust.
Figure 5:
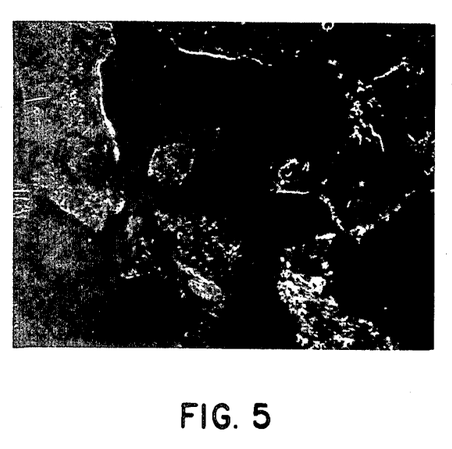
FIG. 5 is a micro-photograph taken at 80x of a reaction product sample containing 1.8% silicon carbide.
Figure 6:
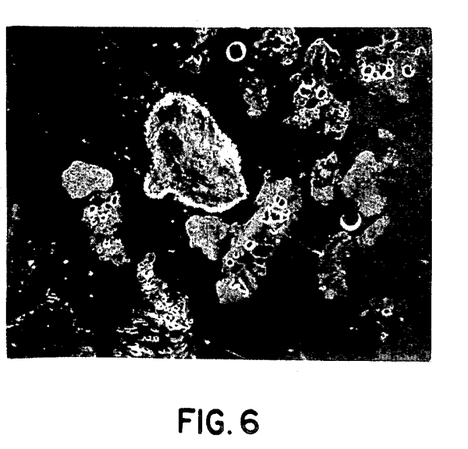
FIG. 6 is a micro-photograph taken at 40x of a reaction product sample containing 6.9% silicon carbide.
Figure 7:
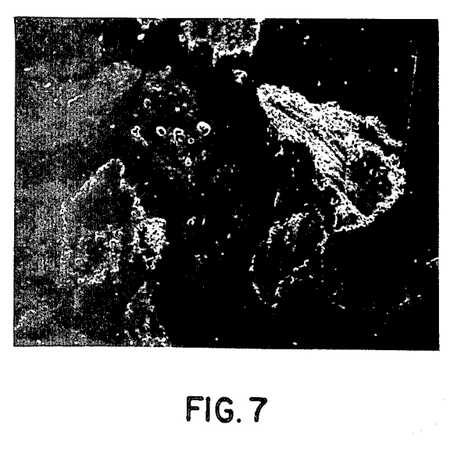
FIG. 7 micro-photograph taken at 40x of a reaction product sample containing 11.6% silicon carbide.
Figure 8:
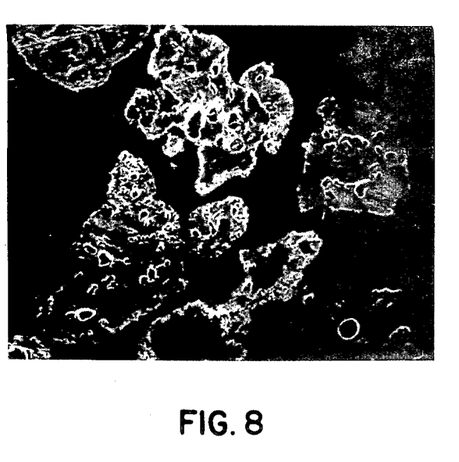
FIG. 8 is a micro-photograph taken at 40x of a reaction product sample containing 24.2% silicon carbide.
Figure 9:
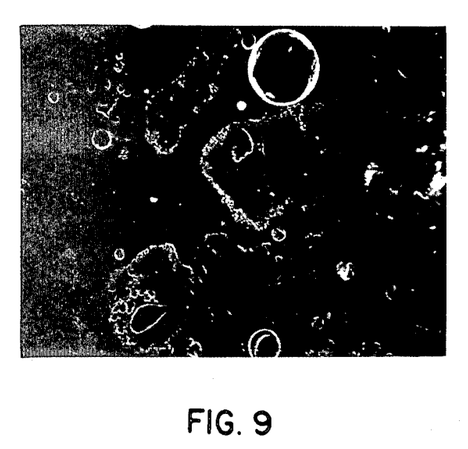
FIG. 9 is a micro-photograph taken at 40x of a reaction product sample containing 41.5% silicon carbide.
Figure 10:
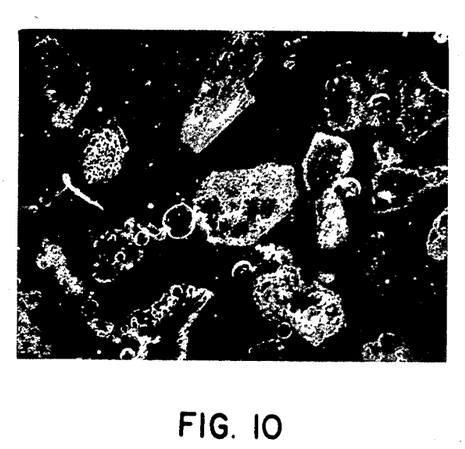
FIG. 10 is a micro-photograph taken at 30x of a reaction product sample containing 60.4% silicon carbide.
Figure 11:
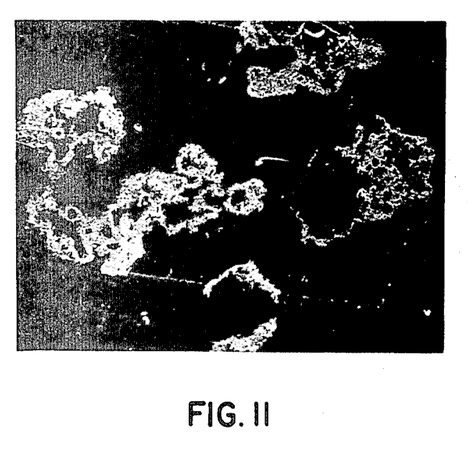
FIG. 11 is a micro-photograph taken at 80x of a reaction product sample containing 100% silicon carbide.
Figure 12:
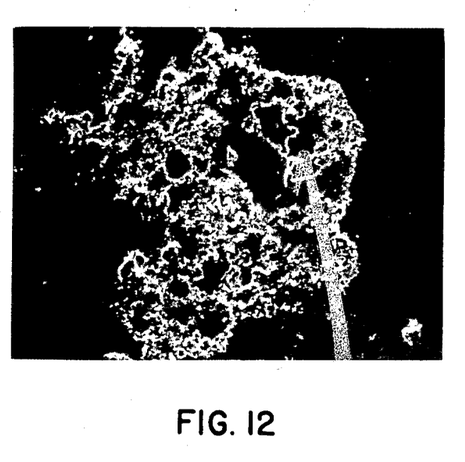
FIG. 12 a micro-photograph taken at 200x of a reaction product sample containing 100% silicon carbide.

Additionally, x-ray diffraction patterns were obtained using Samples 6, 7, and 8, supra, and the patterns observed are set forth in FIGS. 2, 3, and 4 of the drawing. The responses showed that the silicon carbide was in the beta, or cubic, crystalline form. The peak corresponding to carbon diffraction patterns were obtained using Samples 6, 7, and 8. The patterns are given in FIG. 3. The response showed the silicon carbide to be in the beta (B) crystalline form. A peak corresponding to carbon ($d_{002} = 3.42$ A°) was noted in Samples 6 and 8. An unidentified small peak (d=4.07) was observed in Sample 7. Table 5, infra, provides the measured response for the examined samples.

TABLE 5

MEASURED PEAK ANGLES FOR X-RAY DIFFRACTION ANALYSIS OF EXPERIMENTAL SAMPLES

| | | Sample Number | | |
|---|---|---|---|---|
| 20 | d | 6 | 7 | 8 |
| 21.82 | 4.07 | | x | |
| 26.08 | 3.42 | x | | x |
| 35.65 | 2.518 | x | x | x |
| 41.42 | 2.180 | x | x | x |
| 53.70 | 1.707 | x | | |
| 59.98 | 1.542 | x | x | x |
| $a_1$71.80 | 1.315 | x | x | x |
| $a_2$71.98 | | x | x | |
| $a_1$75.50 | 1.258 | x | x | x |
| $a_2$75.73 | | x | x | |

| JC PDS 29-1129 | Comment |
|---|---|
| B SiC | Possibly Sulfur |
| | (002) of Disordered C |
| 2.520 | (004) of Disordered C |
| 2.180 | |
| 1.541 | |
| 1.314 | |
| 1.258 | | x = line present
0 = line present but not resolvable from $a_1$

Samples 6, 7, and 8 were found by spectrographic analysis to be similar, differing only in the amounts of various elements present. Silicon was the major element in all samples; highest in Sample 7 and lowest in the cyclone dust sample (Sample 8). Similarly, the levels of the identified elements were found to decrease in Samples 7, 6, and 8 respectively. This trend was more likely due to dilution of the sample by residual carbon than by other factors. As shown in Table 6 infra, the eleents by order of abundance qualitatively were as follows:

TABLE 6

| QUALITATIVE SPECTROGRAPHIC ANALYSIS | |
|---|---|
| Major Element | Si |
| Minor Elements (0.02 to 2 percent) | V, Fe, Al, Ca, Ni |
| Trace Elements | Ni, Ti, Zr, Mg, Bi, Sr |
| Not Detected | B, Mn, Cr, Mo, Y, Be |
| | Zn, Sn, Cu, Ag, Na, Co |
| | Ge, In, Pb, Ba, Se, La |

EXAMPLE 7

Samples 1-7 were mounted in polymer resin and polished for optical examination. Scanning electron mxicroscopy provided visual definition of the location of silicon carbide on the exposed portion of the samples.

The increasing degree of conversion of the bed particles from carbon to silicon carbide can be noted from the photographs of FIG. 4. The porosity of the increasing carbided product is also evident. The porous structure of the particles of Sample 7 (FIGS. 2g and 2h), which are essentially completely silicon carbide, is of particular interest. The Sample 7 material was obtained by removing the residual carbon in Sample 6 by ignition of a small sample in a tube furnace at about 1000° C.

A preliminary assessment was made of the possibility that the silicon carbide product could be upgraded by conventional physical separation methods. Gravity based separations were made using a halogenated organic heavy liquid (specific gravity-2.3) as the medium. A flotation experiment was also made on a sample of fines.

A ground sample from the product of Run 23 was screened to three size fractions. Each of the size fractions was subjected to separation by mixing in the heavy liquid in a beaker, then decanting into a separatory funnel to settle. The float and sink fractions were removed, filtered, washed, dried and weighed and the silicon carbide content determined by ignition. The data obtained are given in Tables 7 and 8.

The data in Table 6 indicates that milling the product will liberate silicon carbide particles and, as anticipated, the silicon carbide particles are concentrated in the finer sizes. It also appears that it is necessary to grind to below 80 mesh to be effective in the liberation.

The sample in the minus 80 plus 150 mesh size was relatively cleanly separated giving a sink product of 88.2 percent silicon carbide at an overall recovery of 76.7 percent of the silicon carbide contained in the size fraction.

Addition of a dispersant with the minus 150 mesh material appeared to reduce the tendency for flocculation of the fines in the heavy liquid and, as shown in Table 8 a sink fraction product of 85.9 percent grade silicon carbide was made with recovery of 77.7 percent. These data indicate that it is feasible to physically separate the furnace product by methods involving grinding to minus 80 mesh for liberation, and subsequently separating. Because of the substantial difference in the wettability of carbon and silicon carbide, the logical choice for beneficiation is flotation, provided that wet methods are to be used. High intensity wet magnetic separation and immiscible liquid separation are other possible wet procedures.

TABLE 7
HEAVY LIQUID SEPARATION OF SIZED FRACTIONS[1] (SAMPLE FROM RUN 23)

| Size Fraction Mesh | Feed Sample Weight Dist. % | SiC % |
|---|---|---|
| Plus 80 | 7.0 | 17.8 |
| 80 × 150 | 1.40 | 49.9 |
| Minus 150 | 79.0 | 69.6 |
| Calc. Head | 100.0 | 63.98 |

| Float Fractions | | Sink Fractions | |
|---|---|---|---|
| Weight Recovered[2] % | SiC % | Weight Recovered[2] % | SiC % |
| 88.1 | 10.7 | 6.6 | 77.7 |
| 58.7 | 13.9 | 43.4 | 88.2 |
| 6.0 | 42.5 | 85.8 | 71.6 |

TABLE 8
HEAVY LIQUID SEPARATION OF MINUS 150 MESH WITH DISPERSANT[1]

| Feed Sample | | Float | | | Sink | | |
|---|---|---|---|---|---|---|---|
| Weight g | SiC % | Weight g | SiC % | SiC Dist.[3] % | Weight g | SiC % | SiC Dist.[3] % |
| 10.0 | 69.6 | 3.1 | 48.0 | 22.3 | 6.04 | 85.9 | 77.7 |

[1]Specific gravity of liquid 2.3 g/cc.
[2]Percent recovery of size fraction as either float or sink. Some loss in decanting and washing.
[3]Calculated distribution of SiC based on weight of sink and float material recovered. Overall recovery of SiC was 95.9 percent.

The Examples, supra, to produce silicon carbide continuously in the described furnace are illustrative of the utility of the process fo the present invention.

In regard to the process of the present invention, there was no evidence of agglomeration of fed particles or the formation of build-up or coating within the furnace. Operating temperatures were best between 1900° C. and 2000° C. The operation did require periodic removal of material which condensed in the furnace flue but, frequency was not an undue inconvenience. Electrical behavior was well within usual furnace operating conditions, except after the concentration of silicon carbide in the bed material exceeded about 60 percent silicon carbide. The reason for this extremely sharp increase in furnace resistance above this level of carbide may be due to progressive coating of the carbon particle with carbide. However, it is not presently known what the upper limit of silicon carbide for practical operation of the electrothermally heated silicon carbide furnace may be. Design variations in the diameter and depth of immersion of the electrode, could serve to reduce resistance and enable higher carbide content operation, if high resistance proves to be a significant operating limitation and the scope of the present process and product invention is intended to extend to these alternative embodiments.

The mode of operation used to build the silicon carbide content in some embodiments, namely, by recirculation of the bed with relatively small additions of silica is utilized to achieve a gradual change for the Examples, supra. Thus, the feed was not a near stoichiometric blend of silica and carbon. However, the scope of the invention is not intended to be limited to these embodiments.

EXAMPLE 8

In this example, silicon carbide was produced by feeding the furnace continuously and at a steady rate with a mixture comprising petroleum coke and silica sand calculated to yield a silicon carbide/carbon product containing 50 percent by weight silicon carbide and the balance carbon. (1.2 lb. carbon: 1.0 lb. SiO$_2$). A total of 797 lb. of mixture was blended and fed.

Before introducing the blended feed mixture, the furnace was heated to reaction temperature by first changing calcined petroleum coke and eletrothermally heating the coke as in EXAMPLE 2. During the heating period, a steady feed and discharge rate of petroleum coke was established to maintain the inventory within the furnace constant at approximately 250 lbs. A total of 698 lbs. of coke was used for this purpose.

Upon reaching a temperature of 1800° C. in a period of approximately 10 hours, the blended silica/coke feed mxiture was introduced at a rate of 50 lbs. per hour. The discharge rate was controlled accordingly to give a constant amount of material within the furnace. The material discharged was collected in drums and weighed and analyzed for silicon carbide content. Steady state operation in this manner was continued for 19 hours using controlled electrical power input to the furnace to maintain the temperature at 1800° C. After which time the power was turned off and the furnace allowed to cool. The balance of material fed and recovered during this operation is given in Table 8.

TABLE 8
WEIGHT OF MATERIALS FED AND RECOVERED DURING OPERATION OF EXAMPLE 8

| | Weight Lbs. | | | |
|---|---|---|---|---|
| | Total | SiO₂ | C | SiC % |
| Materials Fed | | | | |
| Petroleum Coke | 698 | — | 698 | 0 |
| Feed Mixture | 797 | 354 | 443 | 0 |
| Total Material | 1495 | 354 | 1141 | 0 |
| Materials Recovered | | | | |
| Drum 1[1] | 574 | — | 574 | 0 |
| Drum 2 | 321 | — | 225 | 30 |
| Drum 3 | 216 | — | 119 | 45 |
| Cyclone Dust | 8 | — | — | — |
| | 1119 | — | 918 | — |

It can be noted that there was a weight loss of 376 lbs. The theoretical weight loss corresponding to complete reaction of the silica with carbon would have been 330 lbs. The difference was attributed to handling losses, dust losses and some fume losses. Individual balances for silicon and carbon were good and it is evident that the product was approaching the theoretical silicon carbide content of 50 percent silicon carbide as the run progressed further indicating the effective utilization of silica.

It is significant to note that by the recycle method of operation described in the prior examples, the minimum free carbon to silica in the blended material fed to the furnace was 4.24. The average power requirement during the operation was determined to be about 25 kw-hour per pound of silicon carbide produced. Convention Acheson furnace power usage is reported to be 3.5 kw-hour per pound. Decreasing the ratio of carbon to silica to 1.2 lbs. of carbon per pound of silica and operating on a continuous rather than a recycle basis enable a reduction in power usage.

The calculated theoretical minimum energy requirement using the electrothermal fluidized bed furnace assuming no heat loss to the surroundings would be 2.53 kw-hour per pound corresponding to continuously feeding a stoichiometric blend containing 0.6 lbs. of carbon per 1.0 lbs. of silica.

EXAMPLE 9

The prior EXAMPLES are conducted at temperatures above approximately 2200° C. but less than approximately 2200° C., whereby alpha form silicon carbide is produced.

In summary, the physical character of the silicon carbide product of the present invention illustrates that the carbide forms a coating on the surfaces of the carbon particles, including the internal pore surfaces. It is reasonable to conclude that the carbide formation occurs primarily through the reaction of carbon with a vapor species of silicon—either silicon metal vapor or a sub-oxide of silicon. The very sharp definition of the peak pattern by x-ray diffraction shows that the silicon carbide crystallite size is extremely small, and approximately on the order of 400–800 Angstroms. This is evidence of a rapid formation reaction indicative of a fast vapor deposition mechanism.

It is significant also that the conversion of silica to silicon carbide was reasonably complete. It is estimated from the material balance data of EXAMPLE 8 that of 165 pounds of silicon fed to the furnace as silica sand, 135.5 pounds were recovered as silicon carbide in the final bed product. This averages 82.2 percent silicon recovery as bed product silicon carbide. This relatively high recovery is considered indicative of rapid reaction.

As shown, supra, ignition of the product to remove carbon would be the simplest procedure to produce a 99 plus grade silicon carbide product, and has the advantage of retaining a dry process throughout. Carbon removal appears complete at 1000° C.; however, the process of the present invention is not limited to this temperature, or even to ignition as a means for carbon removal.

The ability to separate silicon carbide from the unreacted carbon by relatively inexpensive physical separation methods is also contemplated. The Examples, supra, indicate that a run-of-furnace silicon carbide—carbon product of about 60 percent silicon carbide could be upgraded to a product of about 90 percent silicon carbide with good recovery of the silicon carbide and the possible re-use of unreacted carbon. The use of a beneficiation operation, rather than ignition, depends on the markets for the product and the desired properties. The method of introducing the feed materials to the furnace is also a factor. A physical beneficiation circuit may require size reduction and wet processing. The product silicon carbide recovered is a fine powder approximately 80 by 150 mesh. Drying equipent is also needed. A physical beneficiation of the product is especially advantageous if a pelletized feed is to be used, in that the recovered carbon containing unseparated silicon carbide could be recirculated to the pelletizing step, thereby improving the overall utilization of feed material.

Although the invention has been described in terms of a preferred method and structure, it will be readily apparent to those skilled in the art that many alterations and modifications thereto may be made without departing from the invention. Accordingly, it is intended that all such modifications and alterations be included within the scope of the invention as defined by the appended claims.

What is claimed is:

1. A method of producing a silicon carbide and carbon product comprising the steps of:
   mixing a substantially greater percentage of additional carbonaceous material in particulate form with a substantially lesser percentage of silicon dioxide to form a first reaction mixture;
   fluidizing in an inert gaseous medium and providing electrical current to the mixture, with the electrical current sufficient to render a temperature sufficient to react the silicon dioxide with the carbonaceous material but insufficient to decompose the formed silicon carbide and for a time sufficient to react substantially all of the silicon dioxide; and successively repeating the above steps until the electrical resistance of the reacted mixture rises asymptotically.

2. The method of claim 1 further including an additional preceding pre-heating step, the preceding pre-heating step comprising:

fluidizing in an inert gaseous medium and providing electrical current to an initial start up charge of particles of carbonaceous material, the electrical current sufficient to raise and maintain the temperature thereof to a temperature sufficient to react silicon dioxide with the carbonaceous material to form silicon carbide.

3. The method of claim 2 wherein the inital start-up charge of carbonaceous material is gradually replaced by the said first reaction mixture.

4. The method of claim 1 wherein the reaction temperature is maintained at approximately at least 900° C. but less than approximately 2000° C. to produce beta form silicon carbide.

5. The method of claim 4 furtther comprising the step of raising the temperature to approximately 2200° C. after formation of the beta form silicon carbide to convert the beta form silicon carbide to alpha form silicon carbide.

6. The method of claim 1 wherein the reaction temperature is maintained at approximately at least 2200° C. to produce alpha form silicon carbide.

7. The method of claim 1 wherein each addition of silicon dioxide to the reaction mixture is made in an approximate ratio of 1 part of silicon dioxide to 9 parts of the prior reaction mixture.

8. The method of claim 7 wherein each successive charge of silicon dioxide and prior reaction mixture is reacted for a period of approximately 6–7 hours.

9. The method of claim 1 wherein electrical current is provided until the silicon carbide content of the reacted mixture reaches approximately 60%.

10. The method of claim 1 further comprising the steps of collecting the reaction mixture prior to each successive addition and mixing of silicon dioxide therewith.

11. The method of claim 1 wherein the steps thereof are repeated until substantially the entire surface of the particles of the carbonaceous material is covered with ultra-microcrystallites of silicon carbide.

12. The method of claim 1 wherein the particles of the carbonaceous material have pores therein and the walls of the pores are substantially entirely coated with ultra-microcrystallites of silicon carbide.

13. The method of claim 1 comprising the further steps of providing oxygen sufficient and temperature sufficient to oxidize the remaining unreacted carbonaceous material to a gas to retain only the remaining ultra-microcrystallites of silrcon carbide.

14. The method of claim 13 further comprising the final step of crushing the retained silicon carbide.

15. The method of claim 1 comprising the further step of enriching the silicon carbide content by crushing the reacted silicon carbide and carbonaceous product and beneficiating the crushed product.

16. The method of claim 15 comprising the further step of removing the carbonaceous material by beneficiation, pelletizing the same, and recirculating the pelletized carbonaceous material as feed stock for reacting with additional silicon dioxide.

17. The method of claim 1 wherein the carbonaceous material utilized is calcined petroleum coke.

18. The method of claim 17 wherein the calcined petroleum coke has a size range of approximately minus 20 plus 65 mesh.

19. The method of claim 1 wherein the silicon dioxide is silica sand having a size range of approxiately minus 40 plus 100 mesh.

20. The method of claim 1 wherein the ultra-microcrystallites of silicon carbide are approximately 400–700 Angstroms in size.

21. A method of producing a beta form silicon carbide and carbon composition comprising the steps of:

fluidizing and providing electrical current to an initial charge of a carbonaceous material to raise the temperature to a temperature sufficient to react silicon dioxide;

mixing additional carbonaceous material with silicon dioxide in a weight ratio of approximately 9:1 to form a first reaction mixture;

replacing the initial heated and fluidized charge with the first reaction mixture gradually while maintaining the fluidization and continuing to provide heat at approximately 1900° C. to produce a product having relatively low percentage silicon carbide content;

recovering the relatively low percentage silicon carbide product;

mixing additional silicon dioxide into the previously reacted and recovered relatively low silicon carbide product in a weight ratio of approximately 9 parts thereof to 1 part of silicon dioxide to form a second reaction mixture;

providing heat and fluidization to the second reaction mixture to maintain the temperature at approximately 1900° C. and for approximately 6–7 hours to produce a product having an increased percentage of silicon carbide content;

recovering the increased percentage silicon carbide product;

mixing further silicon dioxide into the increased perentage silicon carbide content product in a weight ratio of approximately 9 parts thereof to 1 part of silicon dioxide to form a third reaction mixture;

providing heat and fluidization to the third reaction mixture to maintain the temperature at approximately 1900° C.;

continuing to mix in additional silicon dioxide, heating, fluidizing and reacting until the silicon carbide content of the reacted mixture reaches approximately 60%.

22. A method of continuous production of a silicon carbide and carbon product comprising the steps of:

mixing a greater weight of carbon with a lesser weight of silicon dioxide to form a reaction mixture;

continually discharging approximately equal amounts of the reaction mixture from the fluidizing zone to maintain the reaction mixture in the fluidizing zone in dynamic equilibrium;

passing a fluidizing medium consisting essentially of an inert gas upwardly and from a bottom portion of the fluidizing zone through the reaction mixture in the fluidizing zone at a velocity sufficient to fluidize the reaction mixture and in a substantially uniform manner to remove waste gases from the fluidizing zone and substantially to prevent reprecipitation of impurities both within the fluidizing zone and onto the continually introduced reaction mixture;

heating the reaction mixture while in the uniform fluidized state within the fluidizing zone to a temperature in excess of about 1700° C. and for a mean time sufficient to produce a product comprising approximately at least 60% silicon carbide in the fluidizing zone.

* * * * *